(12) United States Patent
Kim et al.

(10) Patent No.: US 9,001,110 B2
(45) Date of Patent: Apr. 7, 2015

(54) DUAL LIQUID CRYSTAL BARRIER, AND STEREOSCOPIC IMAGE DISPLAY DEVICE HAVING THE SAME

(75) Inventors: Beom-Shik Kim, Yongin (KR); Hui Nam, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 408 days.

(21) Appl. No.: 13/595,108

(22) Filed: Aug. 27, 2012

(65) Prior Publication Data

US 2013/0257840 A1    Oct. 3, 2013

(30) Foreign Application Priority Data

Apr. 2, 2012 (KR) .................... 10-2012-0033801

(51) Int. Cl.
| | |
|---|---|
| *G09G 3/36* | (2006.01) |
| *G02F 1/1335* | (2006.01) |
| *G06F 3/038* | (2013.01) |
| *G02F 1/1343* | (2006.01) |
| *G09G 3/00* | (2006.01) |

(52) U.S. Cl.
CPC ............ *G02F 1/1335* (2013.01); *G02F 1/1343* (2013.01); *G09G 3/003* (2013.01); *G09G 3/36* (2013.01); *G09G 3/3611* (2013.01); *G09G 2300/023* (2013.01)

(58) Field of Classification Search
CPC ..... G06F 3/038; G02F 1/1343; G02F 1/1335; G09G 3/36
See application file for complete search history.

(56) References Cited

U.S. PATENT DOCUMENTS

| | | | |
|---|---|---|---|
| 8,284,335 B2* | 10/2012 | Kim et al. ................ | 349/15 |
| 8,384,834 B2* | 2/2013 | Ku et al. ................. | 349/15 |
| 8,487,917 B2* | 7/2013 | Han et al. ................ | 345/204 |
| 2008/0169997 A1* | 7/2008 | Choi ....................... | 345/6 |
| 2011/0051239 A1 | 3/2011 | Daiku | |

FOREIGN PATENT DOCUMENTS

| | | |
|---|---|---|
| JP | 2010-276965 | 12/2010 |
| KR | 10-2008-0067472 A | 7/2008 |

* cited by examiner

*Primary Examiner* — Andrew Sasinowski
(74) *Attorney, Agent, or Firm* — Lee & Morse, P.C.

(57) ABSTRACT

A dual liquid crystal barrier includes a first substrate having space-division electrodes, the space-division electrodes including first electrodes and second electrodes, a second substrate having time-division electrodes, the time-division electrodes including third electrodes and fourth electrodes, and a liquid crystal layer between the first substrate and the second substrate. The dual liquid crystal barrier is configured to selectively operate as a space-division liquid crystal barrier based on the space-division electrodes, or a time-division liquid crystal barrier based on the time-division electrodes.

20 Claims, 11 Drawing Sheets

DUAL LIQUID CRYSTAL BARRIER, AND STEREOSCOPIC IMAGE DISPLAY DEVICE HAVING THE SAME

CROSS-REFERENCE TO RELATED APPLICATION

This application claims priority under 35 USC §119 to Korean Patent Applications No. 10-2012-0033801, filed on Apr. 2, 2012 in the Korean Intellectual Property Office (KIPO), the contents of which are incorporated herein in its entirety by reference.

BACKGROUND

1. Technical Field

Example embodiments relate generally to a stereoscopic (3D) image display device employing a parallax barrier method. More particularly, embodiments relate to a dual liquid crystal barrier that selectively operates as a time-division liquid crystal barrier or a space-division liquid crystal barrier, and a stereoscopic image display device having the same.

2. Description of the Related Art

According to a stereoscopic image display technique, a stereoscopic image may be implemented by providing different images (i.e., a left image and a right image) to a left eye and a right eye, respectively. Generally, stereoscopic image display devices may be classified into glasses type stereoscopic image display devices and non-glasses type stereoscopic image display devices. Recently, the non-glasses type stereoscopic image display devices have been developed because the non-glasses type stereoscopic image display devices provide more convenience to a viewer compared to the glasses type stereoscopic image display devices. In addition, among the non-glasses type stereoscopic image display devices, a stereoscopic image display device employing a parallax barrier method is widely used.

SUMMARY

Embodiments are directed to a dual liquid crystal barrier including a first substrate having space-division electrodes, the space-division electrodes including first electrodes and second electrodes, a second substrate having time-division electrodes, the time-division electrodes including third electrodes and fourth electrodes, and a liquid crystal layer between the first substrate and the second substrate, wherein the dual liquid crystal barrier is configured to selectively operate as a space-division liquid crystal barrier based on the space-division electrodes, or a time-division liquid crystal barrier based on the time-division electrodes.

The dual liquid crystal barrier may operate as the time-division liquid crystal barrier when an external temperature is higher than a predetermined temperature. The dual liquid crystal barrier may operate as the space-division liquid crystal barrier when the external temperature is not higher than the predetermined temperature.

The dual liquid crystal barrier may operate as the time-division liquid crystal barrier when a first external input is received. The dual liquid crystal barrier may operate as the space-division liquid crystal barrier when a second external input is received.

When the dual liquid crystal barrier operates as the space-division liquid crystal barrier, a driving voltage may be applied to the first electrodes, a reference voltage may be applied to the second electrodes, and a common voltage may be applied to the third electrodes and the fourth electrodes.

When the dual liquid crystal barrier operates as the space-division liquid crystal barrier, the space-division liquid crystal barrier may operate in a normally white mode, the driving voltage may be determined to control the liquid crystal layer to block light, and the reference voltage and the common voltage may be determined to be 0V.

When the dual liquid crystal barrier operates as the space-division liquid crystal barrier, positions corresponding to the first electrodes may act as blocking areas in the liquid crystal layer, and positions corresponding to the second electrodes may act as opening areas in the liquid crystal layer.

When the dual liquid crystal barrier operates as the time-division liquid crystal barrier, a driving voltage and a reference voltage may be alternately applied to the third electrodes and the fourth electrodes, respectively, and a common voltage may be applied to the first electrodes and the second electrodes.

When the dual liquid crystal barrier operates as the time-division liquid crystal barrier, the time-division liquid crystal barrier may operate in a normally white mode, the driving voltage may be determined to control the liquid crystal layer to block light, and the reference voltage and the common voltage may be determined to be 0V.

When the dual liquid crystal barrier operates as the time-division liquid crystal barrier, during a first period, positions corresponding to the third electrodes may act as blocking areas in the liquid crystal layer, and positions corresponding to the fourth electrodes may act as opening areas in the liquid crystal layer, and during a second period, the positions corresponding to the third electrodes may act as the opening areas in the liquid crystal layer, and the positions corresponding to the fourth electrodes may act as the blocking areas in the liquid crystal layer.

The barrier may further include a first polarizing plate on one surface of the first substrate, and a second polarizing plate on one surface of the second substrate.

Embodiments are also directed to a stereoscopic image display device including a dual liquid crystal barrier configured to selectively operate as a space-division liquid crystal barrier based on space-division electrodes, or as a time-division liquid crystal barrier based on time-division electrodes, a display panel configured to fix positions of pixels for outputting a left image and positions of pixels for outputting a right image when the dual liquid crystal barrier operates as the space-division liquid crystal barrier, and configured to alternately change the positions of the pixels for outputting the left image and the positions of the pixels for outputting the right image when the dual liquid crystal barrier operates as the time-division liquid crystal barrier; and a peripheral circuit configured to control operations of the dual liquid crystal barrier and operations of the display panel.

The dual liquid crystal barrier may include a first substrate having the space-division electrodes, the space-division electrodes including first electrodes and second electrodes, a second substrate having the time-division electrodes, the time-division electrodes including third electrodes and fourth electrodes, a liquid crystal layer between the first substrate and the second substrate, a first polarizing plate on one surface of the first substrate, and a second polarizing plate on one surface of the second substrate.

The dual liquid crystal barrier may operate as the time-division liquid crystal barrier when an external temperature is higher than a predetermined temperature. The dual liquid crystal barrier may operate as the space-division liquid crystal barrier when the external temperature is not higher than the predetermined temperature.

The dual liquid crystal barrier may operate as the time-division liquid crystal barrier when a first external input is received. The dual liquid crystal barrier may operate as the space-division liquid crystal barrier when a second external input is received.

When the dual liquid crystal barrier operates as the space-division liquid crystal barrier, a driving voltage may be applied to the first electrodes, a reference voltage may be applied to the second electrodes, and a common voltage may be applied to the third electrodes and the fourth electrodes.

When the dual liquid crystal barrier operates as the space-division liquid crystal barrier, the space-division liquid crystal barrier may operate in a normally white mode, the driving voltage may be determined to control the liquid crystal layer to block light, and the reference voltage and the common voltage may be determined to be 0V.

When the dual liquid crystal barrier operates as the space-division liquid crystal barrier, positions corresponding to the first electrodes may act as blocking areas in the liquid crystal layer, and positions corresponding to the second electrodes act as opening areas in the liquid crystal layer.

When the dual liquid crystal barrier operates as the time-division liquid crystal barrier, a driving voltage and a reference voltage may be alternately applied to the third electrodes and the fourth electrodes, respectively, and a common voltage may be applied to the first electrodes and the second electrodes.

When the dual liquid crystal barrier operates as the time-division liquid crystal barrier, the time-division liquid crystal barrier may operate in a normally white mode, the driving voltage may be determined to control the liquid crystal layer to block light, and the reference voltage and the common voltage may be determined to be 0V.

When the dual liquid crystal barrier operates as the time-division liquid crystal barrier, during a first period, positions corresponding to the third electrodes may act as blocking areas in the liquid crystal layer, and positions corresponding to the fourth electrodes act as opening areas in the liquid crystal layer, and during a second period, the positions corresponding to the third electrodes may act as the opening areas in the liquid crystal layer, and the positions corresponding to the fourth electrodes may act as the blocking areas in the liquid crystal layer.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
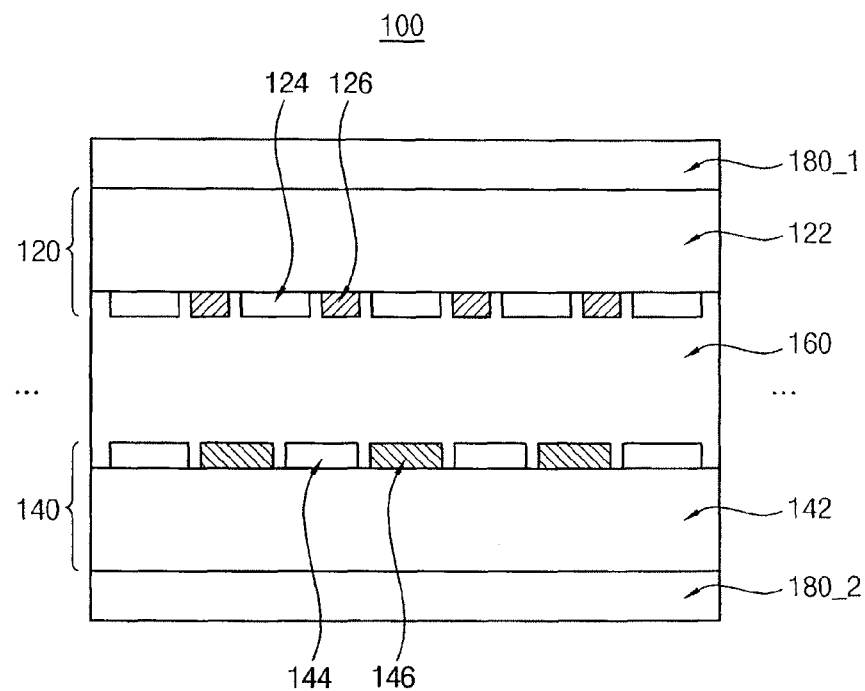
FIG. 1 is a cross-sectional view illustrating a dual liquid crystal barrier according to example embodiments.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope thereof to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings thereof. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a cross-sectional view illustrating a dual liquid crystal barrier according to example embodiments.

Referring to FIG. 1, the dual liquid crystal barrier 100 may include a first substrate 120, a second substrate 140, and a liquid crystal layer 160. Although it is illustrated in FIG. 1 that the first substrate 120 is an upper substrate and the second substrate 140 is a lower substrate, in other implementations, for example, the first substrate 120 may be a lower substrate, and the second substrate 140 may be an upper substrate.

The first substrate 120 may include space-division electrodes having first electrodes 124 and second electrodes 126. Here, a width of the first electrodes 124 may be greater than a width of the second electrodes 126. In an example embodiment, if an external temperature is not higher than a predetermined temperature, the dual liquid crystal barrier 100 may operate as space-division liquid crystal barrier. In another example embodiment, if a second external input for controlling the dual liquid crystal barrier 100 to operate as the space-division liquid crystal barrier is received from a user (or, an operator), the dual liquid crystal barrier 100 may operate as the space-division liquid crystal barrier. Generally, a response speed of a liquid crystal may become slow as an external temperature falls. Hence, crosstalk between a left image and a right image may be caused in a time-division liquid crystal barrier. As a result, an image quality of a stereoscopic image may be degraded by the crosstalk between the left image and the right image. Thus, the dual liquid crystal barrier 100 may be configured to operate as the space-division liquid crystal barrier when an external temperature is lower than a predetermined temperature (e.g., a threshold temperature that may result in the crosstalk between the left image and the right image), or when a user intends to control the dual liquid crystal barrier 100 to operate as the space-division liquid crystal barrier. In detail, the dual liquid crystal barrier 100 may operate as the space-division liquid crystal barrier by applying a driving voltage to the first electrodes 124, by applying a reference voltage to the second electrodes 126, and by applying a common voltage to the third and fourth electrodes 144 and 146. In some example embodiments, the dual liquid crystal barrier 100 may further include a first polarizing plate 180_1 that is placed on one surface (e.g., an upper surface in FIG. 1) of the first substrate 120.

The first substrate 120 may be a transparent substrate 122 (e.g., a glass substrate). The first and second electrodes 124 and 126 may be transparent electrodes. For example, the first and second electrodes 124 and 126 may be formed using indium tin oxide (ITO) or indium zinc oxide (IZO). As illustrated in FIG. 1, the first electrodes 124 and the second electrodes 126 that are formed on the first substrate 120 may be alternately arranged in a first direction (e.g., X-axis direction). The first electrodes 124 and the second electrodes 126 as shown in FIG. 1 may extend in a direction perpendicular to the page of FIG. 1 (i.e., the first electrodes 124 and the second electrodes 126 may be stripe patterns). As described above, the dual liquid crystal barrier 100 may operate as the space-division liquid crystal barrier when the driving voltage is applied to the first electrodes 124, the reference voltage is applied to the second electrodes 126, and the common voltage is applied to the third and fourth electrodes 144 and 146. In one example embodiment, the dual liquid crystal barrier 100 may operate in a normally white mode, the driving voltage may be determined to control the liquid crystal layer 160 to block light, and the reference voltage and the common voltage may have 0V. As a result, positions corresponding to the first electrodes 124 may act as blocking areas in the liquid crystal layer 160, and positions corresponding to the second electrodes 126 may act as opening areas in the liquid crystal layer 160.

Although it is described above that the dual liquid crystal barrier 100 may operate in a normally white mode (i.e., the dual liquid crystal barrier 100 allows light to pass through in an off-state, and prevents light from passing through in an on-state), in other implementations, for example, the dual liquid crystal barrier 100 may operate in a normally black mode (i.e., the dual liquid crystal barrier 100 allows light to pass through in an on-state, and prevents light from passing through in an off-state).

The second substrate 140 may include time-division electrodes having the third electrodes 144 and the fourth electrodes 146. Here, a width of the third electrodes 144 may be substantially the same as a width of the fourth electrodes 146. In one example embodiment, if an external temperature is higher than a predetermined temperature, the dual liquid crystal barrier 100 may operate as time-division liquid crystal barrier. In another example embodiment, if a first external input for controlling the dual liquid crystal barrier 100 to operate as the time-division liquid crystal barrier is received from a user, the dual liquid crystal barrier 100 may operate as the time-division liquid crystal barrier. Generally, positions of opening areas and positions of blocking areas may be fixed in the liquid crystal layer 160 when the dual liquid crystal barrier operates as the space-division liquid crystal barrier. As a result, a stereoscopic image may have a relatively low resolution. Thus, the dual liquid crystal barrier 100 may operate as the time-division liquid crystal barrier when an external temperature is higher than a predetermined temperature (e.g., a threshold temperature that may result in the crosstalk between the left image and the right image), or when a user intends to control the dual liquid crystal barrier 100 to operate as the time-division liquid crystal barrier. In detail, the dual liquid crystal barrier 100 may operate as the time-division liquid crystal barrier by alternately applying a driving voltage and a reference voltage to the third electrodes 144 and the fourth electrodes 146, respectively (e.g., the reference voltage is applied to the fourth electrodes 146 when the driving voltage is applied to the third electrodes 144, and the reference voltage is applied to the third electrodes 144 when the driving voltage is applied to the fourth electrodes 146), and by applying a common voltage to the first and second electrodes 124 and 126. In some example embodiments, the dual liquid crystal barrier 100 may further include a second polarizing plate 180_2 that is placed on one surface (e.g., a lower surface in FIG. 1) of the second substrate 140.

The second substrate 140 may be a transparent substrate 142 (e.g., a glass substrate). The third and fourth electrodes 144 and 146 may be transparent electrodes. For example, the third and fourth electrodes 144 and 146 may be formed using indium tin oxide (ITO) or indium zinc oxide (IZO). As illustrated in FIG. 1, the third electrodes 144 and the fourth electrodes 146 that are formed on the second substrate 140 may be alternately arranged in the first direction (e.g., X-axis direction). Here, the third electrodes 144 and the fourth electrodes 146 may be extend in a vertical direction (i.e., the third electrodes 144 and the fourth electrodes 146 may be stripe patterns extending perpendicular to the page of FIG. 1). As described above, the dual liquid crystal barrier 100 may operate as the time-division liquid crystal barrier when the driving voltage and the reference voltage are alternately applied to the third electrodes 144 and the fourth electrodes 146, respectively, and the common voltage is applied to the first and second electrodes 124 and 126. In one example embodiment, the dual liquid crystal barrier 100 may operate in a normally white mode, the driving voltage may be determined to control the liquid crystal layer 160 to block light, and the reference voltage and the common voltage may have 0V. As a result, during a first period, positions corresponding to the third electrodes 144 may act as blocking areas in the liquid crystal layer 160, and positions corresponding to the fourth electrodes 146 may act as opening areas in the liquid crystal layer 160. During a second period, the positions corresponding to the third electrodes 144 may act as opening areas in the liquid crystal layer 160, and the positions corresponding to the fourth electrodes 146 may act as blocking areas in the liquid crystal layer 160. A sum of the first period and the second period corresponds to one frame. Each frame may have a short time so that a viewer may not recognize a flicker. For example, the first period may be 1/120 sec, the second period may be 1/120 sec, and one frame may be 1/60 sec.

The liquid crystal layer 160 may be placed between the first substrate 120 and the second substrate 140. Although not illustrated in FIG. 1, a first alignment plate may be placed between the first substrate 120 and the liquid crystal layer 160, and a second alignment plate may be placed between the second substrate 140 and the liquid crystal layer 160. In the liquid crystal layer 160, the opening areas and the blocking areas may be formed based on changes of a molecular arrangement of the liquid crystal. In detail, the molecular arrangement of the liquid crystal may be changed based on voltages applied to the first through fourth electrodes 124, 126, 144, and 148. As described above, when the dual liquid crystal barrier 100 operates as the space-division liquid crystal barrier, the blocking areas may be formed in the liquid crystal layer 160 by the first electrodes 124 of the first substrate 120, the driving voltage being applied to the first electrodes 124 of the first substrate 120. The opening areas may be formed in the liquid crystal layer 160 by the second electrodes 126 of the first substrate 120, the reference voltage being applied to the second electrodes 126 of the first substrate 120. On the other hand, when the dual liquid crystal barrier 100 operates as the time-division liquid crystal barrier, the blocking areas may be formed in the liquid crystal layer 160 by the third electrodes 144 of the second substrate 140 during the first period, the driving voltage being applied to the third electrodes 144 of the second substrate 140. The opening areas may be formed in the liquid crystal layer 160 by the fourth electrodes 146 of the second substrate 140 during the first period, the reference voltage being applied to the fourth electrodes 146 of the second substrate 140. In addition, the blocking areas may be formed in the liquid crystal layer 160 by the fourth electrodes 146 of the second substrate 140 during the second period, the driving voltage being applied to the fourth electrodes 146 of the second substrate 140. The opening areas may be formed in the liquid crystal layer 160 by the third electrodes 144 of the second substrate 140 during the second period, the reference voltage being applied to the third electrodes 144 of the second substrate 140. Although it is described above that the dual liquid crystal barrier 100 operates in a normally white mode, it should be understood that in other implementations, the dual liquid crystal barrier 100 may operate in a normally black mode.

The dual liquid crystal barrier 100 may selectively operate as the space-division liquid crystal barrier or the time-division liquid crystal barrier based on an external temperature or an external input. Such selective operation may be possible because the dual liquid crystal barrier 100 has a structure having the space-division electrodes 124 and 126 formed on the first substrate 120 and the time-division electrodes 144 and 146, the liquid crystal layer 160 being placed between the first substrate 120 and the second substrate 140. As a result, a stereoscopic image display device having the dual liquid crystal barrier 100 may improve an image quality of a stereoscopic image by preventing a crosstalk between a left image and a right image from being caused even when an external temperature is lower than a predetermined temperature, and may provide a stereoscopic image having a high resolution when an external temperature is higher than a predetermined temperature. Although it is illustrated in FIG. 1 that the first substrate 120 including the space-division electrodes 124 and 126 is an upper substrate, and the second substrate 140 including the time-division electrodes 144 and 146 is a lower substrate, in other implementations, for example, the first substrate 120 including the space-division electrodes 124 and 126 may be a lower substrate, and the second substrate 140 including the time-division electrodes 144 and 146 may be an upper substrate.

Figure 2:
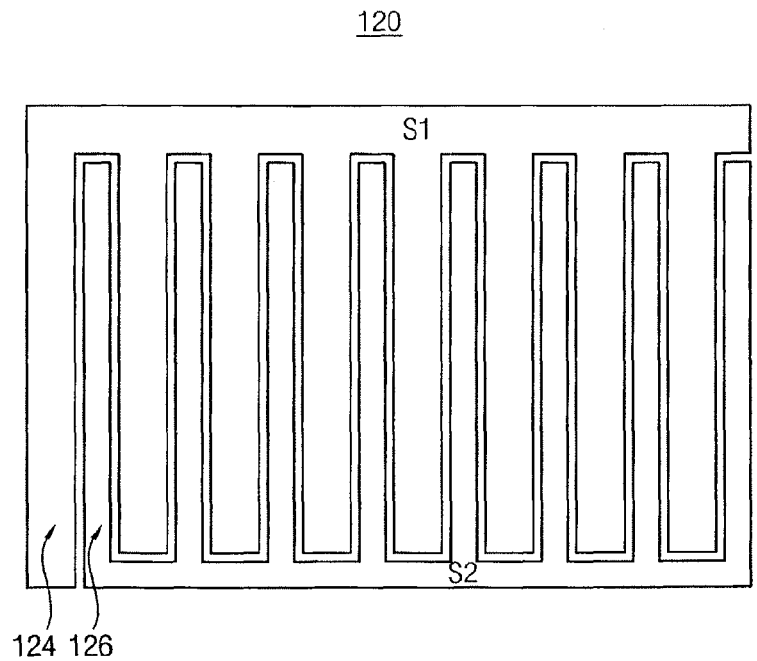
FIG. 2 is a plan view illustrating space-division electrodes included in a dual liquid crystal barrier of FIG. 1.
Figure 3:
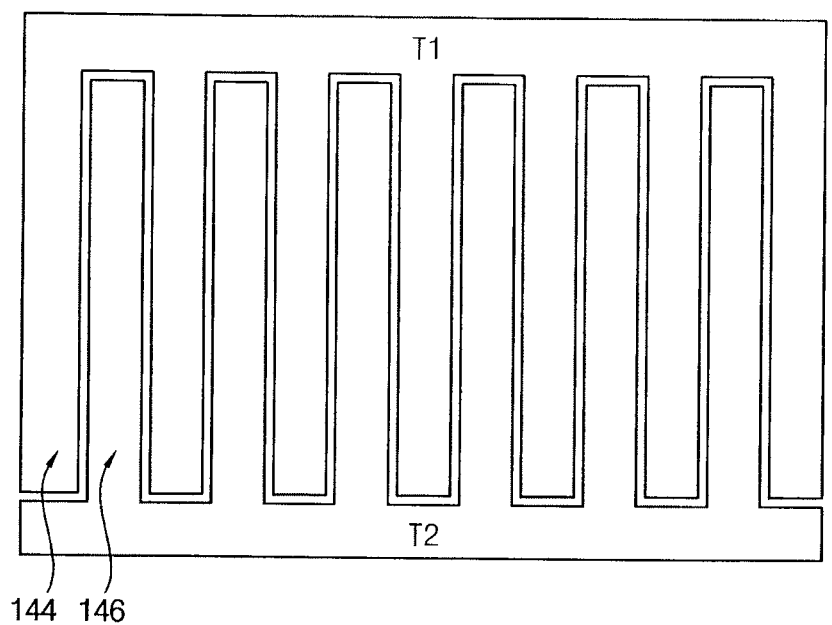
FIG. 3 is a plan view illustrating time-division electrodes included in a dual liquid crystal barrier of FIG. 1.

FIG. 2 is a plan view illustrating space-division electrodes included in the dual liquid crystal barrier of FIG. 1. FIG. 3 is a plan view illustrating time-division electrodes included in the dual liquid crystal barrier of FIG. 1.

Referring to FIGS. 2 and 3, the space-division electrodes 124 and 126 (i.e., indicated as S1 and S2) included in the dual liquid crystal barrier 100 are shown in FIG. 2, and the time-division electrodes 144 and 146 (i.e., indicated as T1 and T2) included in the dual liquid crystal barrier 100 are shown in FIG. 3. As illustrated in FIG. 2, a width of the first electrodes 124 may be greater than a width of the second electrodes 126 in the first substrate 120. The dual liquid crystal barrier 100 may operate as the space-division liquid crystal barrier when an external temperature is not higher than a predetermined temperature, or when a user intends to control the dual liquid crystal barrier 100 to operate as the space-division liquid crystal barrier. In this case, the driving voltage may be applied to the first electrodes 124, the reference voltage may be applied to the second electrodes 126, and the common voltage may be applied to the third and fourth electrodes 144 and 146. Thus, the positions corresponding to the first electrodes 124 may act as the blocking areas in the liquid crystal layer 160, and the positions corresponding to the second electrodes 126 may act as the opening areas in the liquid crystal layer 160. Hence, when the dual liquid crystal barrier 100 operates as the space-division liquid crystal barrier, positions of the opening areas and positions of the blocking areas may be fixed in the liquid crystal layer 160. In one example embodiment, an aperture ratio may be controlled by adjusting a width of the first electrodes 124 and a width of the second electrodes 126. For example, a width of the first electrodes 124 may be greater than a width of the second electrodes 126 as illustrated in FIG. 2. Accordingly, an aperture ratio may be smaller than 50%.

As illustrated in FIG. 3, a width of the third electrodes 144 may be substantially the same as the fourth electrodes 146 in the second substrate 140. The dual liquid crystal barrier 100 may operate as the time-division liquid crystal barrier when an external temperature is higher than a predetermined temperature, or when a user intends to control the dual liquid crystal barrier 100 to operate as the time-division liquid crystal barrier. In this case, the driving voltage and the reference voltage may be alternately applied to the third electrodes 144 and the fourth electrodes 146, respectively (e.g., the reference voltage is applied to the fourth electrodes 146 when the driving voltage is applied to the third electrodes 144, and the reference voltage is applied to the third electrodes 144 when the driving voltage is applied to the fourth electrodes 146). The common voltage may be applied to the first and second electrodes 124 and 126. Generally, a sum of the first period and the second period corresponds to one frame. Here, during the first period, the positions corresponding to the third electrodes 144 may act as the blocking areas in the liquid crystal layer 160, and the positions corresponding to the fourth electrodes 146 may act as the opening areas in the liquid crystal layer 160. During the second period, the positions corresponding to the third electrodes 144 may act as the opening areas in the liquid crystal layer 160, and the positions corresponding to the fourth electrodes 146 may act as the blocking areas in the liquid crystal layer 160. That is, when the dual liquid crystal barrier 100 operates as the time-division liquid crystal barrier, positions of the opening areas and positions of the blocking areas may be alternately changed according to time. In one example embodiment, if a gap between the third electrodes 144 and the fourth electrodes 467 is substantially zero, an aperture ratio may be substantially 50%.

Figure 4:
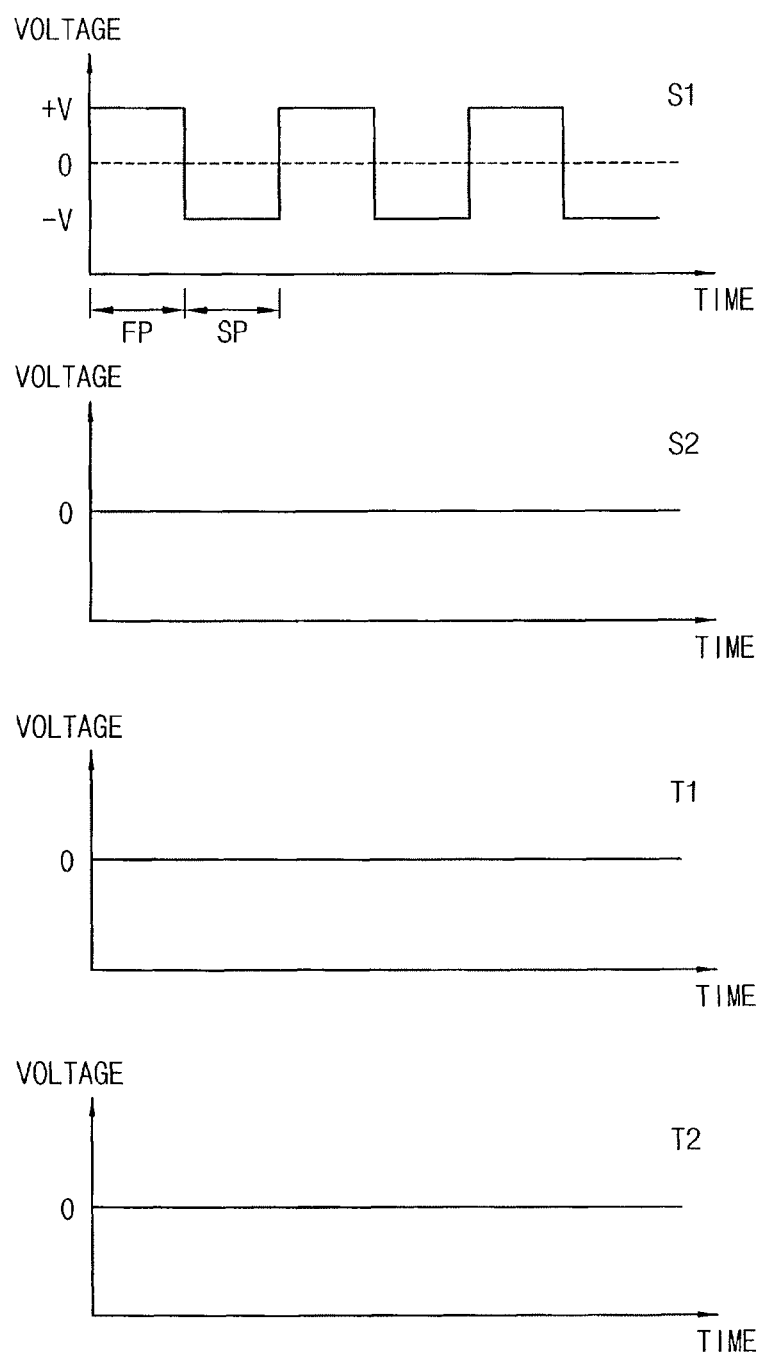
FIG. 4 is a graph illustrating an example in which voltages are applied to space-division electrodes and time-division electrodes included in a dual liquid crystal barrier of FIG. 1.
Figure 5:
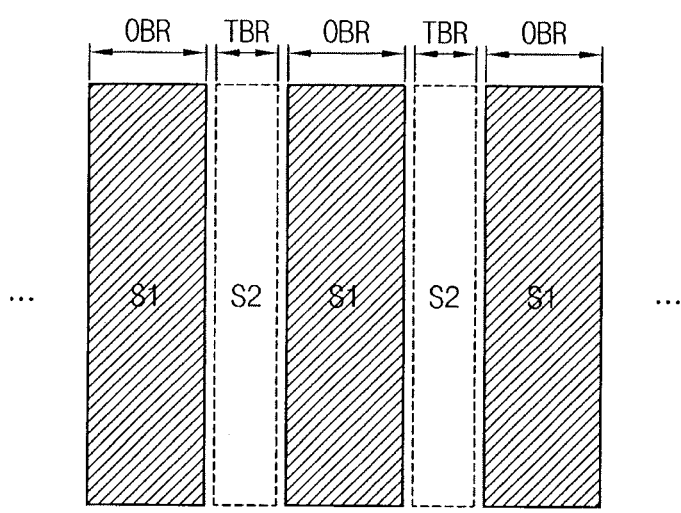
FIG. 5 is a diagram illustrating an example in which opening areas and blocking areas are formed in a liquid crystal layer by applied voltages of FIG. 4.

FIG. 4 is a graph illustrating an example in which voltages are applied to space-division electrodes and time-division electrodes included in a dual liquid crystal barrier of FIG. 1. FIG. 5 is a diagram illustrating an example in which opening areas and blocking areas are formed in a liquid crystal layer by applied voltages of FIG. 4.

Referring to FIGS. 4 and 5, when an external temperature is not higher than a predetermined temperature, or when a user intends to control the dual liquid crystal barrier 100 to operate as the space-division liquid crystal barrier, the driving voltage may be applied to the first electrodes 124 (i.e., indicated as S1), the reference voltage may be applied to the second electrodes 126 (i.e., indicated as S2), and the common voltage may be applied to the third and fourth electrodes 144 and 146 (i.e., indicated as T1 and T2). As illustrated in FIG. 4, the driving voltage applied to the first electrodes 124 may correspond to a positive driving voltage +V during a first period FP, and may correspond to a negative driving voltage −V during a second period SP. Here, the positive driving voltage +V and the negative driving voltage −V may be alternately applied because the liquid crystal layer 160 may be degraded if a voltage having one polarity is continuously applied. In addition, the reference voltage applied to the second electrodes 126 may be maintained to have 0V. Further, the common voltage applied to the third and fourth electrodes 144 and 146 of the second substrate 140 may be maintained to have 0V. Therefore, as illustrated in FIG. 5, the positions corresponding to the first electrodes 124 (i.e., indicated as S1) may act as the blocking areas OBR in the liquid crystal layer 160, and the positions corresponding to the second electrodes 126 (i.e., indicated as S2) may act as the opening areas TBR in the liquid crystal layer 160. As described above, an aperture ratio may be controlled by adjusting a width of the first electrodes 124 and a width of the second electrodes 126. In addition, positions of the blocking areas OBR and positions of the opening areas TBR may be fixed in the liquid crystal layer 160 when the dual liquid crystal barrier 100 operates as the space-division liquid crystal barrier. Although it is described above that the dual liquid crystal barrier 100 operates in a normally white mode (i.e., the dual liquid crystal barrier 100 allows light to pass through in an off-state, and prevents light from passing through in an on-state), in other implementations, the dual liquid crystal barrier 100 may operate in a normally black mode (i.e., the dual liquid crystal barrier 100 allows light to pass through in an on-state, and prevents light from passing through in an off-state).

Figure 6:
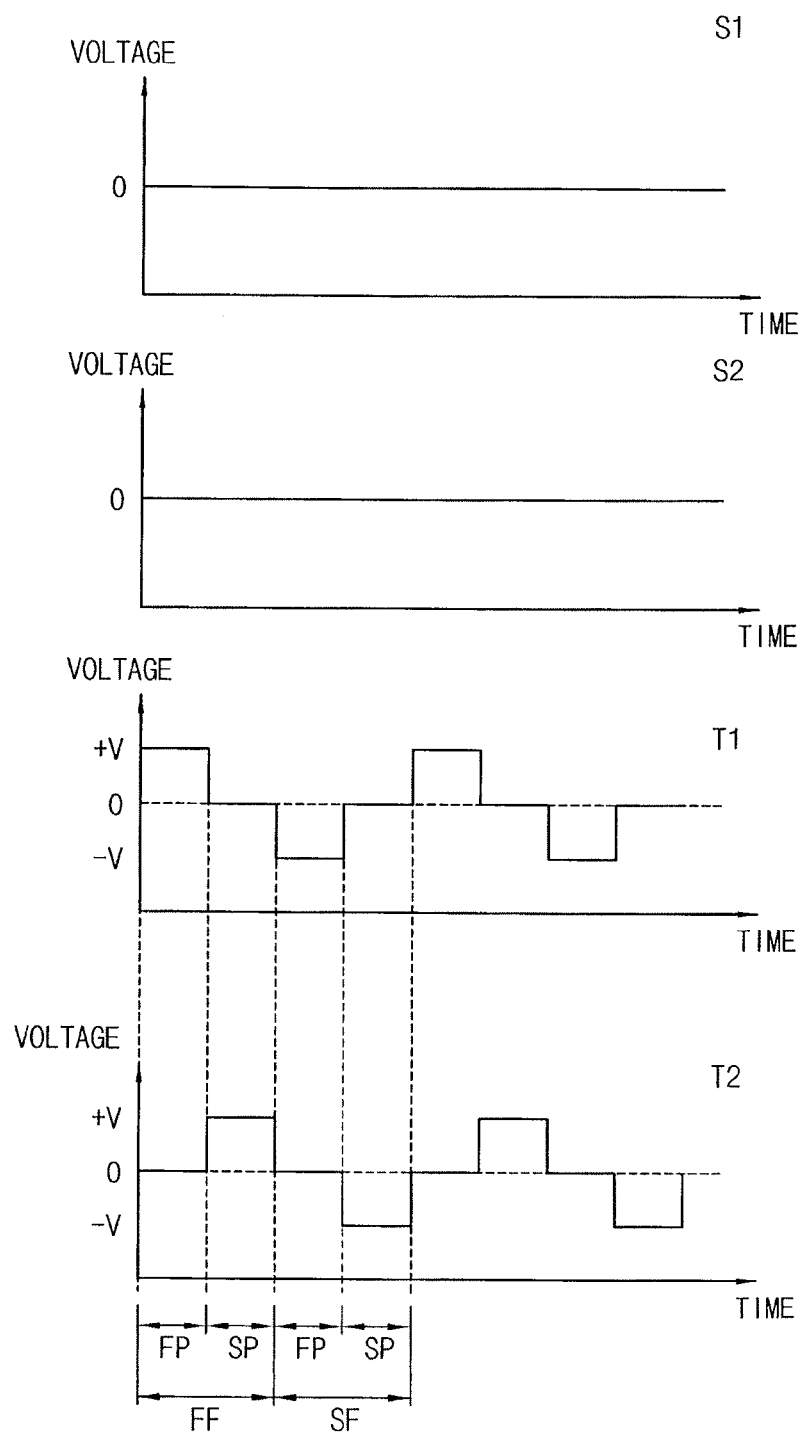
FIG. 6 is a graph illustrating another example in which voltages are applied to space-division electrodes and time-division electrodes included in a dual liquid crystal barrier of FIG. 1.
Figure 7:
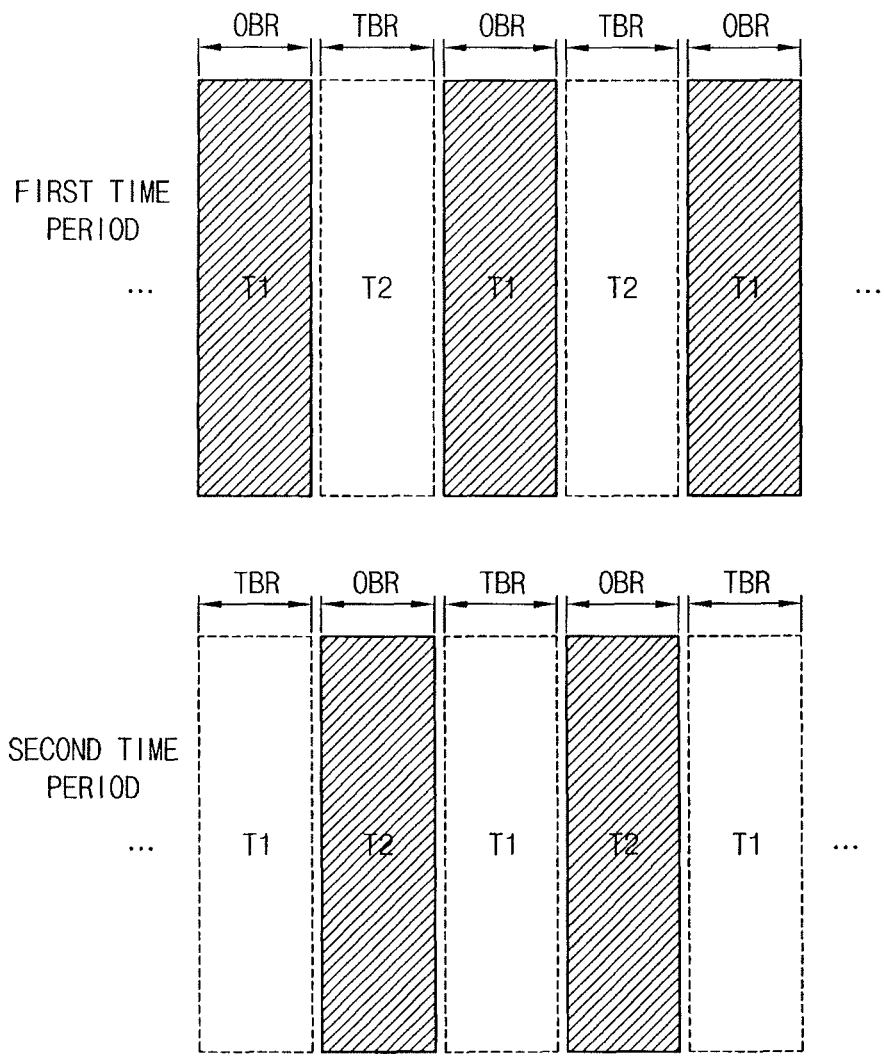
FIG. 7 is a diagram illustrating another example in which opening areas and blocking areas are formed in a liquid crystal layer by applied voltages of FIG. 6.

FIG. 6 is a graph illustrating another example in which voltages are applied to space-division electrodes and time-division electrodes included in a dual liquid crystal barrier of FIG. 1. FIG. 7 is a diagram illustrating another example in which opening areas and blocking areas are formed in a liquid crystal layer by applied voltages of FIG. 6.

Referring to FIGS. 6 and 7, when an external temperature is higher than a predetermined temperature, or when a user intends to control the dual liquid crystal barrier 100 to operate as the time-division liquid crystal barrier, the driving voltage and the reference voltage may be alternately applied to the third electrodes 144 (i.e., indicated as T1) and the fourth electrodes 146 (i.e., indicated as T2), respectively, and the common voltage may be applied to the first and second electrodes 124 and 126 (i.e., indicated as S1 and S2). For instance, the reference voltage may be applied to the fourth electrodes 146 when the driving voltage is applied to the third electrodes 144, and the reference voltage may be applied to the third electrodes 144 when the driving voltage is applied to the fourth electrodes 146. Here, the reference voltage and the common voltage may be maintained to have 0V. As illustrated in FIG. 6, during a first period FP of a first frame FF, a positive driving voltage +V may be applied to the third electrodes 144, and the reference voltage may be applied to the fourth electrodes 146. During a second period SP of the first frame FF, the reference voltage may be applied to the third electrodes 144, and the positive driving voltage +V may be applied to the fourth electrodes 146. Similarly, during a first period FP of a second frame SF, a negative driving voltage −V may be applied to the third electrodes 144, and the reference voltage may be applied to the fourth electrodes 146. During a second period SP of the second frame SF, the reference voltage may be applied to the third electrodes 144, and the negative driving voltage −V may be applied to the fourth electrodes 146. The positive driving voltage +V and the negative driving voltage −V may be alternately applied to avoid degradation of the liquid crystal layer 160 that may occur if a voltage having one polarity were to be continuously applied.

Therefore, as illustrated in FIG. 7, the positions corresponding to the third electrodes 144 (i.e., indicated as T1) may act as the blocking areas OBR in the liquid crystal layer 160, and the positions corresponding to the fourth electrodes 146 (i.e., indicated as T2) may act as the opening areas TBR in the liquid crystal layer 160, during the first periods FP of the first and second frames FF and SF. On the other hand, the positions corresponding to the third electrodes 144 (i.e., indicated as T1) may act as the opening areas TBR in the liquid crystal layer 160, and the positions corresponding to the fourth electrodes 146 (i.e., indicated as T2) may act as the blocking areas OBR in the liquid crystal layer 160, during the second periods SP of the first and second frames FF and SF. Thus, positions of the blocking areas OBR and positions of the opening areas TBR may be alternately changed in the liquid crystal layer 160 when the dual liquid crystal barrier 100 operates as the time-division liquid crystal barrier. That is, positions of the blocking areas OBR and positions of the opening areas TBR are not fixed in the liquid crystal layer 160 when the dual liquid crystal barrier 100 operates as the time-division liquid crystal barrier. As described above, a width of the third electrodes 144 may be substantially the same as a width of the fourth electrodes 146. Although it is described above that the dual liquid crystal barrier 100 operates in a normally white mode (i.e., the dual liquid crystal barrier 100 allows light to pass through in an off-state, and prevents light from passing through in an on-state), in other implementations, the dual liquid crystal barrier 100 may operate in a normally black mode (i.e., the dual liquid crystal barrier 100 allows light to pass through in an on-state, and prevents light from passing through in an off-state).

Figure 8:
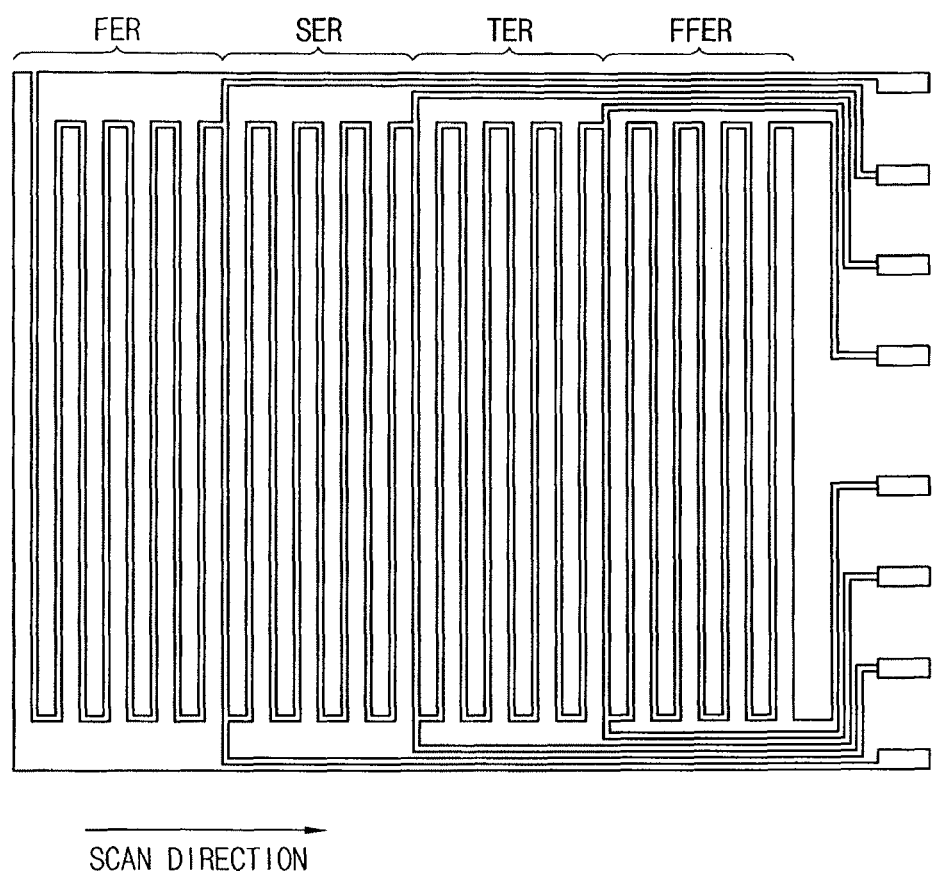
FIG. 8 is a diagram illustrating an example in which time-division electrodes are arranged separately by area in a dual liquid crystal barrier of FIG. 1.

FIG. 8 is a diagram illustrating an example in which time-division electrodes are arranged separately by area in a dual liquid crystal barrier of FIG. 1.

Referring to FIG. 8, the time-division electrodes 144 and 146 that are formed on the second substrate 140 may be arranged separately by area. As illustrated in FIG. 8, a scan direction may be perpendicular to a length direction of the time-division electrodes 144 and 146, and the time-division electrodes 144 and 146 may be divided into first through fourth areas FER, SER, TER, and FFER. Generally, in holding-type display devices such as a liquid crystal display (LCD) device or an organic light emitting display (OLED) device, an image may be sequentially (i.e., not simultaneously) changed during one frame. Thus, a crosstalk may be reduced by operating the time-division electrodes 144 and 146 by area in response thereto. The number of areas having the time-division electrodes 144 and 146 may be variously determined according to required conditions. As the number of areas having the time-division electrodes 144 and 146 increases, electrical wirings may be complicated although the luminance may be improved. Thus, the number of areas having the time-division electrodes 144 and 146 may be determined considering the trade-off relationship. In some example embodiments, the space-division electrodes 124 and 126 that are formed on the first substrate 120 may not be arranged separately by area when the time-division electrodes 144 and 146 that are formed on the second substrate 140 are arranged separately by area.

Figure 9:
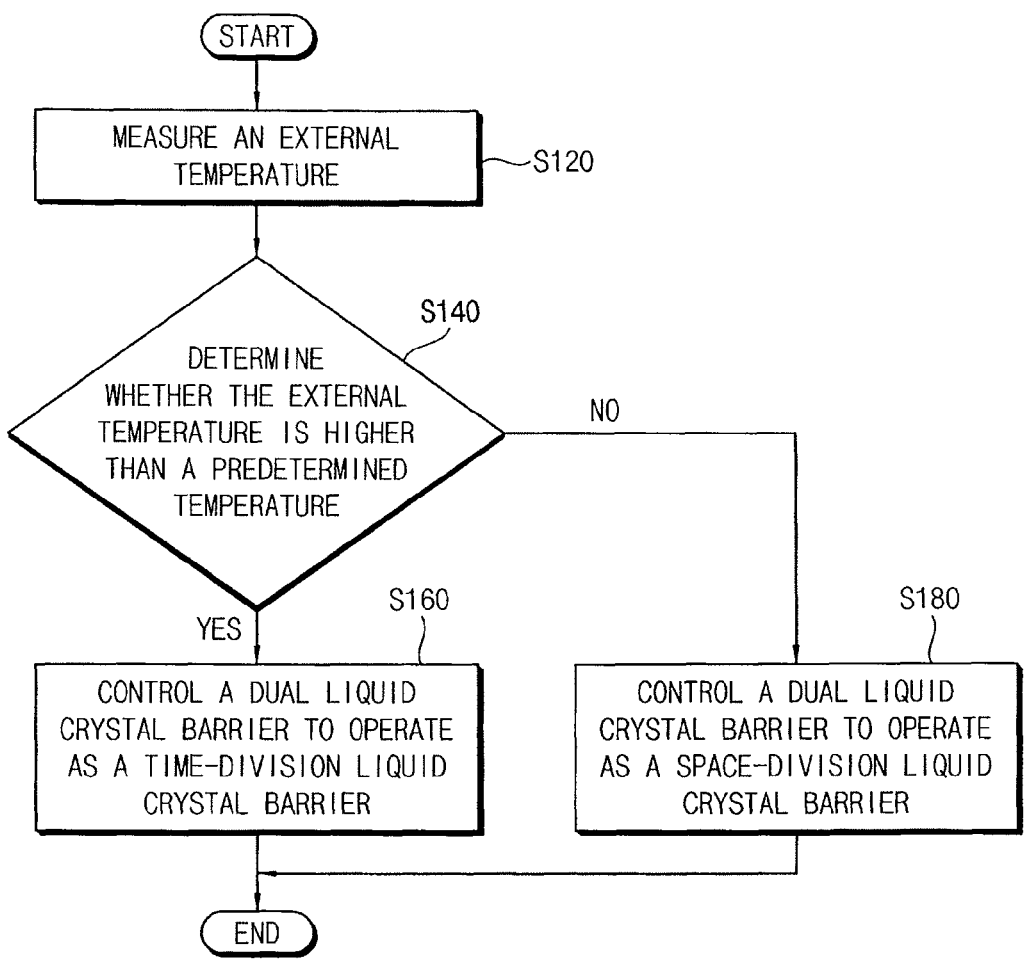
FIG. 9 is a flow chart illustrating a method of operating a dual liquid crystal barrier of FIG. 1 as a time-division liquid crystal barrier or a space-division liquid crystal barrier based on an external temperature.

FIG. 9 is a flow chart illustrating a method of operating a dual liquid crystal barrier of FIG. 1 as a time-division liquid crystal barrier or a space-division liquid crystal barrier based on an external temperature.

Referring to FIG. 9, by the method of FIG. 9, an external temperature may be measured (S120). Next, it may be determined whether the external temperature is higher than a predetermined temperature (S140). When the external temperature is higher than the predetermined temperature, the dual liquid crystal barrier 100 of FIG. 1 may be controlled to operate as a time-division liquid crystal barrier (S160). When the external temperature is not higher than the predetermined temperature, the dual liquid crystal barrier 100 of FIG. 1 may be controlled to operate as a space-division liquid crystal barrier (S180). As described above, a response speed of a liquid crystal may become slow as an external temperature falls. Hence, crosstalk between a left image and a right image may be caused in a time-division liquid crystal barrier. Thus, the method of FIG. 9 may control the dual liquid crystal barrier 100 of FIG. 1 to operate as a space-division liquid crystal barrier when the external temperature is not higher than the predetermined temperature. As a result, the method of FIG. 9 may prevent an image quality degradation of a stereoscopic image due to the crosstalk between the left image and the right image. On the other hand, positions of opening areas and positions of blocking areas may be fixed when the dual liquid crystal barrier 100 of FIG. 1 operates as a space-division liquid crystal barrier. Hence, a stereoscopic image may have a low resolution. Thus, the method of FIG. 9 may control the dual liquid crystal barrier 100 of FIG. 1 to operate as a time-division liquid crystal barrier when the external temperature is higher than the predetermined temperature. As a result, a stereoscopic image having a high resolution may be implemented.

Figure 10:
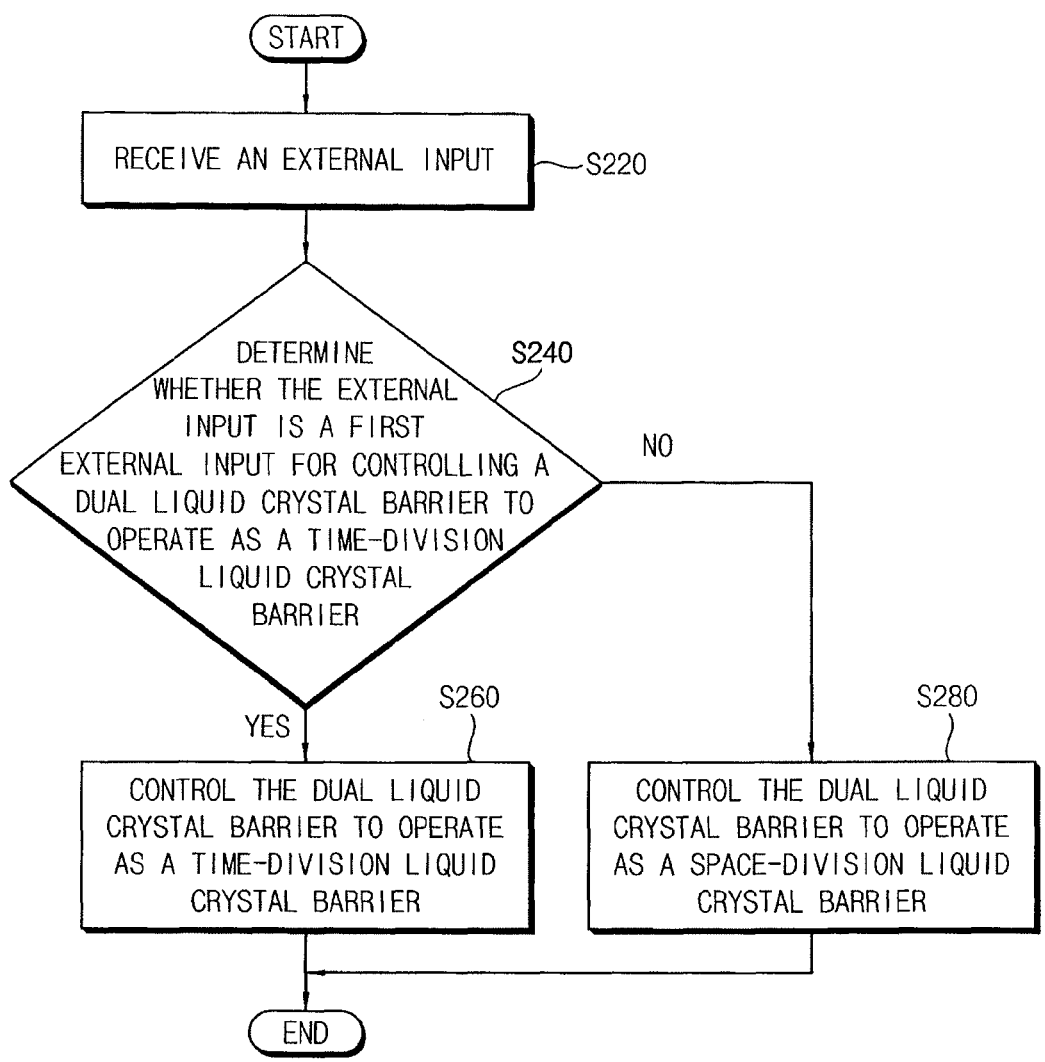
FIG. 10 is a flow chart illustrating a method of operating a dual liquid crystal barrier of FIG. 1 as a time-division liquid crystal barrier or a space-division liquid crystal barrier based on an external input.

FIG. 10 is a flow chart illustrating a method of operating a dual liquid crystal barrier of FIG. 1 as a time-division liquid crystal barrier or a space-division liquid crystal barrier based on an external input.

Referring to FIG. 10, by the method of FIG. 10, an external input may be received (S220). Next, it may be determined whether the external input is a first external input for controlling the dual liquid crystal barrier 100 of FIG. 1 to operate as a time-division liquid crystal barrier (S240). When the external input is the first external input, the dual liquid crystal barrier 100 of FIG. 1 may be controlled to operate as a time-division liquid crystal barrier (S260). When the external input is not the first external input (i.e., when the external input is a second external input), the dual liquid crystal barrier 100 of FIG. 1 may be controlled to operate as a space-division liquid crystal barrier (S280). That is, the method of FIG. 10 may allow a user to control the dual liquid crystal barrier 100 of FIG. 1 to operate as a time-division liquid crystal barrier or a space-division liquid crystal barrier.

Figure 11:
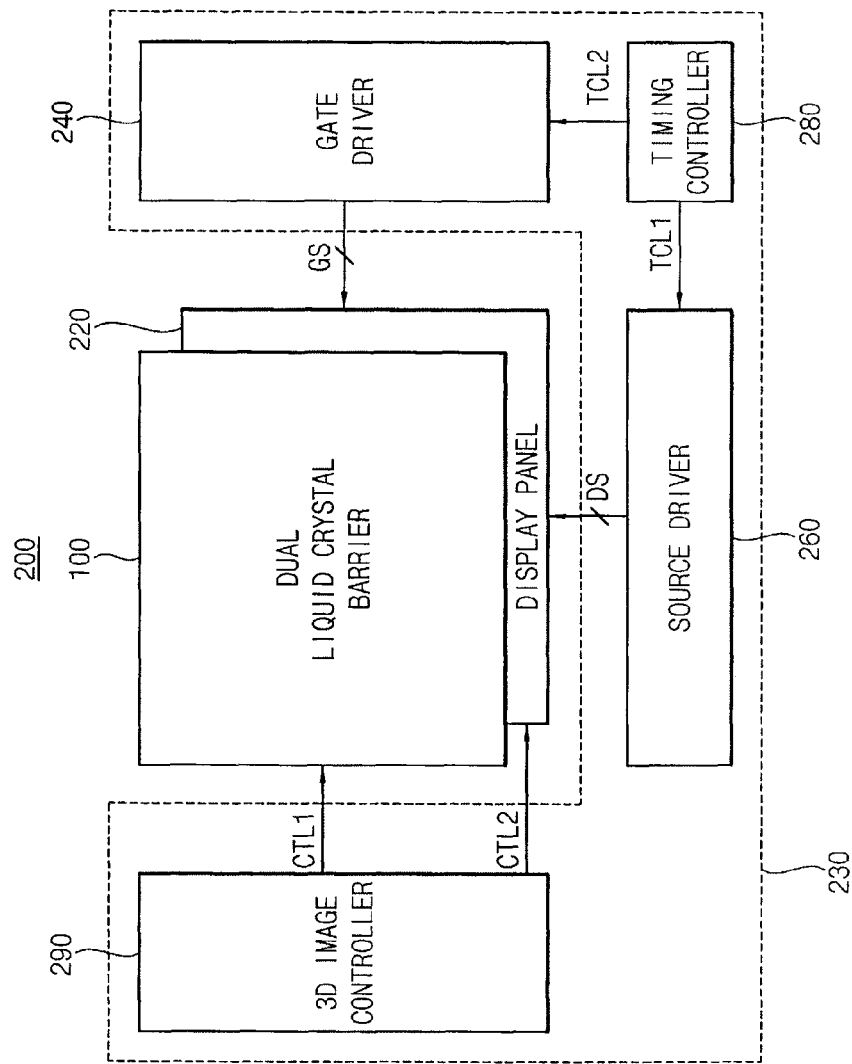
FIG. 11 is a block diagram illustrating a stereoscopic image display device according to example embodiments.

FIG. 11 is a block diagram illustrating a stereoscopic (3D) image display device according to example embodiments.

Referring to FIG. 11, the stereoscopic image display device 200 may include a dual liquid crystal barrier 100, a display panel 220, and a peripheral circuit 230. Here, the peripheral circuit 230 may include a gate driver 240, a source driver 260, a timing controller 280, a stereoscopic image controller 290, etc.

The dual liquid crystal barrier 100 may selectively operate as a space-division liquid crystal barrier (i.e., based on space-division electrodes), or a time-division liquid crystal barrier (i.e., based on time-division electrodes). For this operation, the dual liquid crystal barrier 100 may include a first substrate having the space-division electrodes that include first electrodes and second electrodes for forming opening areas and blocking areas in a liquid crystal layer, a second substrate having the time-division electrodes that include third electrodes and fourth electrodes for forming opening areas and blocking areas in the liquid crystal layer, and the liquid crystal layer that is placed between the first substrate and the second substrate. In some example embodiments, the dual liquid crystal barrier 100 may further include a first polarizing plate that is placed on one surface of the first substrate, and a second polarizing plate that is placed on one surface of the second substrate. In one example embodiment, the dual liquid crystal barrier 100 may operate as a time-division liquid crystal barrier when an external temperature is higher than a predetermined temperature, and may operate as a space-division liquid crystal barrier when the external temperature is not higher than the predetermined temperature. In another example embodiment, the dual liquid crystal barrier 100 may operate as a time-division liquid crystal barrier when a first external input is received, and may operate as a space-division liquid crystal barrier when a second external input is received. Since the dual liquid crystal barrier 100 is described above, duplicated descriptions will not be repeated.

In one example embodiment, the display panel 220 may fix positions of pixels for outputting a left image and positions of pixels for outputting a right image when the dual liquid crystal barrier 100 operates as the space-division liquid crystal barrier. In another example embodiment, the display panel 220 may alternately change positions of pixels for outputting a left image and positions of pixels for outputting a right image in synchronization with operations of the dual liquid crystal barrier 100 when the dual liquid crystal barrier 100 operates as the time-division liquid crystal barrier. As a result, the stereoscopic image display device 200 may implement a stereoscopic image by providing the left image and the right image to a left eye and a right eye, respectively through the opening areas of the liquid crystal layer, the positions of the opening areas being fixed, when the dual liquid crystal barrier 100 operates as the space-division liquid crystal barrier. In addition, the stereoscopic image display device 200 may implement a stereoscopic image by providing the left image (or, the right image) and the right image (or, the left image) to a left eye (or, a right eye) and a right eye (or, a left eye), respectively through the opening areas of the liquid crystal layer during a first period, and by providing the right image (or, the left image) and the left image (or, the right image) to a right eye (or, a left eye) and a left eye (or, a right eye), respectively through the opening areas of the liquid crystal layer during a second period when the dual liquid crystal barrier 100 operates as the time-division liquid crystal barrier. That is, the positions of the opening areas are changed when the dual liquid crystal barrier 100 operates as the time-division liquid crystal barrier. Thus, the display panel 220 may fix or may alternately change the positions of the pixels for outputting the left image and the positions of the pixels for outputting the right image according to operating modes of the dual liquid crystal barrier 100 (i.e., the dual liquid crystal barrier 100 may operate as the space-division liquid crystal barrier or the time-division liquid crystal barrier).

The peripheral circuit 230 may control operations of the dual liquid crystal barrier 100 and operations of the display panel 220. For example, the gate driver 240 may provide a gate signal GS to the display panel 220, the source driver 260 may provide a data signal DS to the display panel 220, and the timing controller 280 may provide control signals TCL1 and TCL2 to the gate driver 240 and the source driver 260. In addition, the stereoscopic (3D) image controller 290 may control operations of the display panel 220 by providing a control signal CTL2 to the display panel 220, and may control operations of the dual liquid crystal barrier 100 by providing a control signal CTL1 to the dual liquid crystal barrier 100. It should be understood that a structure of the peripheral circuit 230 is simplified for convenience of descriptions. Thus, the peripheral circuit 230 may further include additional components such as a gradation voltage generator according to types of the display panel 220. For example, the display panel 220 may correspond to a Cathode Ray Tube (CRT) panel, a liquid crystal display (LCD) panel, an organic light emitting display (OLED) panel, etc.

Figure 12:
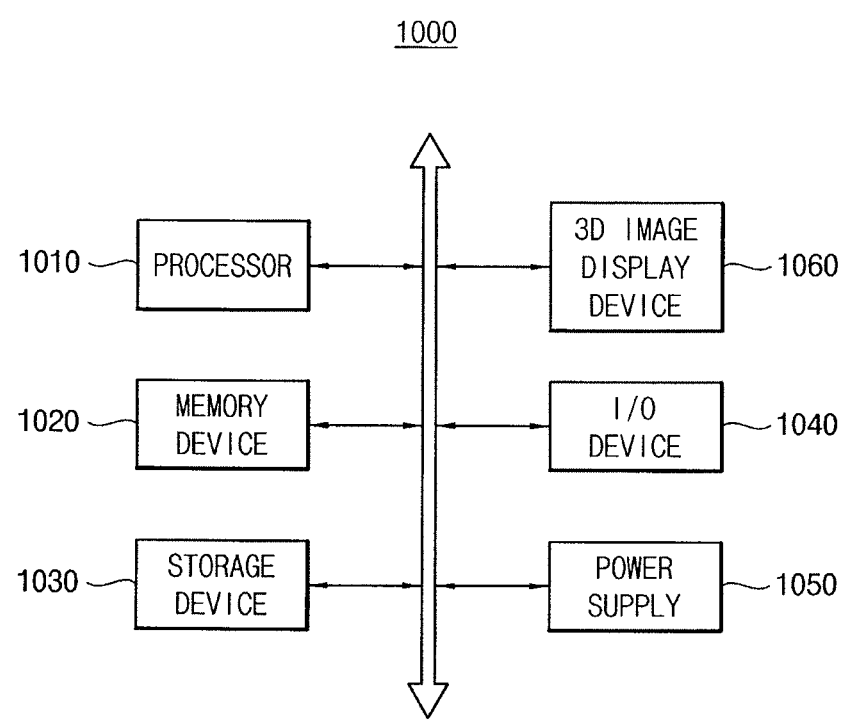
FIG. 12 is a block diagram illustrating an electric device having a stereoscopic image display device of FIG. 11.

FIG. 12 is a block diagram illustrating an electric device having a stereoscopic image display device of FIG. 11.

Referring to FIG. 12, the electric device 1000 may include a processor 1010, a memory device 1020, a storage device 1030, an input/output (I/O) device 1040, a power supply 1050, and a stereoscopic image display device 1060. Here, the stereoscopic image display device 1060 may correspond to the stereoscopic image display device 200 of FIG. 11. In addition, the electric device 1000 may further include a plurality of ports for communicating a video card, a sound card, a memory card, a universal serial bus (USB) device, other electric devices, etc.

The processor 1010 may perform various computing functions. The processor 1010 may be a micro processor, a central processing unit (CPU), etc. The processor 1010 may be coupled to other components via an address bus, a control bus, a data bus, etc. Further, the processor 1010 may be coupled to an extended bus such as a peripheral component interconnection (PCI) bus. The memory device 1020 may store data for operations of the electric device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, etc. The storage device 1030 may be a solid state drive (SSD) device, a hard disk drive (HDD) device, a CD-ROM device, etc.

The I/O device 1040 may be an input device such as a keyboard, a keypad, a mouse, a touch screen, etc, and an output device such as a printer, a speaker, etc. In some example embodiments, the stereoscopic image display device 1060 may be included as the output device in the I/O device 1040. The power supply 1050 may provide a power for operations of the electric device 1000. The stereoscopic image display device 1060 may communicate with other components via the buses or other communication links. As described above, the stereoscopic image display device 1060 may implement a stereoscopic image by alternately providing a left image and a right image to a left eye and a right eye, respectively using a dual liquid crystal barrier. Here, the dual liquid crystal barrier may include a first substrate having space-division electrodes that include first electrodes and second electrodes for forming opening areas and blocking areas in a liquid crystal layer, a second substrate having time-division electrodes that include third electrodes and fourth electrodes for forming opening areas and blocking areas in the liquid crystal layer, and the liquid crystal layer that is placed between the first substrate and the second substrate. In some example embodiments, the dual liquid crystal barrier may further include a first polarizing plate that is placed on one surface of the first substrate, and a second polarizing plate that is placed on one surface of the second substrate.

The embodiments may be applied to an electric device having a stereoscopic image display device. For example, the embodiments may be applied to a television, a computer monitor, a laptop, a digital camera, a cellular phone, a smart phone, a personal digital assistant (PDA), a portable multimedia player (PMP), a MP3 player, a navigation system, a video phone, etc.

By way of summation and review, according to the stereoscopic image display device employing the parallax barrier method, a stereoscopic image may be created by providing a left image and a right image to a left eye and a right eye, respectively through opening areas of a time-division liquid crystal barrier or a space-division liquid crystal barrier. In the case of the space-division liquid crystal barrier, positions of opening areas and positions of blocking areas may be fixed. In the case of the time-division liquid crystal barrier, positions of the opening areas and positions of the blocking areas may be alternately changed with respect to time.

In the case of the space-division liquid crystal barrier, a stereoscopic image may have a relatively low resolution because positions of the opening areas and positions of the blocking areas are fixed. In addition, in the case of the time-division liquid crystal barrier, positions of the opening areas and positions of the blocking areas may be alternately changed at high speed. Accordingly, crosstalk may be caused between a left image and a right image (i.e., the image quality may be degraded) if the response speed of a liquid crystal becomes slow when an external temperature falls.

Herein, embodiments may provide a dual liquid crystal barrier that has a structure in which space-division electrodes and time-division electrodes are formed on a first substrate and a second substrate, respectively, with a liquid crystal layer being placed between the first substrate and the second substrate. Therefore, a dual liquid crystal barrier according to embodiments may selectively operate as a time-division liquid crystal barrier or a space-division liquid crystal barrier according to an external temperature or an external input. A stereoscopic image display device according to example embodiments may include the dual liquid crystal barrier such that crosstalk between a left image and a right image may be prevented even when an external temperature falls below a predetermined temperature. As a result, an image quality of a stereoscopic image may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A dual liquid crystal barrier, comprising:
a first substrate having space-division electrodes, the space-division electrodes including first electrodes and second electrodes;
a second substrate having time-division electrodes, the time-division electrodes including third electrodes and fourth electrodes; and
a liquid crystal layer between the first substrate and the second substrate,
wherein the dual liquid crystal barrier is configured to selectively operate as a space-division liquid crystal barrier based on the space-division electrodes, or a time-division liquid crystal barrier based on the time-division electrodes.

2. The barrier as claimed in claim 1, wherein:
the dual liquid crystal barrier operates as the time-division liquid crystal barrier when an external temperature is higher than a predetermined temperature, and
the dual liquid crystal barrier operates as the space-division liquid crystal barrier when the external temperature is not higher than the predetermined temperature.

3. The barrier as claimed in claim 1, wherein:
the dual liquid crystal barrier operates as the time-division liquid crystal barrier when a first external input is received, and
the dual liquid crystal barrier operates as the space-division liquid crystal barrier when a second external input is received.

4. The barrier as claimed in claim 1, wherein, when the dual liquid crystal barrier operates as the space-division liquid crystal barrier:
a driving voltage is applied to the first electrodes,
a reference voltage is applied to the second electrodes, and
a common voltage is applied to the third electrodes and the fourth electrodes.

5. The barrier as claimed in claim 4, wherein, when the dual liquid crystal barrier operates as the space-division liquid crystal barrier:
the space-division liquid crystal barrier operates in a normally white mode,
the driving voltage is determined to control the liquid crystal layer to block light, and
the reference voltage and the common voltage are determined to be 0V.

6. The barrier as claimed in claim 5, wherein, when the dual liquid crystal barrier operates as the space-division liquid crystal barrier:
positions corresponding to the first electrodes act as blocking areas in the liquid crystal layer, and
positions corresponding to the second electrodes act as opening areas in the liquid crystal layer.

7. The barrier as claimed in claim 1, wherein, when the dual liquid crystal barrier operates as the time-division liquid crystal barrier:
a driving voltage and a reference voltage are alternately applied to the third electrodes and the fourth electrodes, respectively, and
a common voltage is applied to the first electrodes and the second electrodes.

8. The barrier as claimed in claim 7, wherein, when the dual liquid crystal barrier operates as the time-division liquid crystal barrier:
the time-division liquid crystal barrier operates in a normally white mode,
the driving voltage is determined to control the liquid crystal layer to block light, and
the reference voltage and the common voltage are determined to be 0V.

9. The barrier as claimed in claim 8, wherein, when the dual liquid crystal barrier operates as the time-division liquid crystal barrier:
during a first period, positions corresponding to the third electrodes act as blocking areas in the liquid crystal layer, and positions corresponding to the fourth electrodes act as opening areas in the liquid crystal layer, and
during a second period, the positions corresponding to the third electrodes act as the opening areas in the liquid crystal layer, and the positions corresponding to the fourth electrodes act as the blocking areas in the liquid crystal layer.

10. The barrier as claimed in claim 1, further comprising:
a first polarizing plate on one surface of the first substrate; and
a second polarizing plate on one surface of the second substrate.

11. A stereoscopic image display device, comprising:
a dual liquid crystal barrier configured to selectively operate as a space-division liquid crystal barrier based on space-division electrodes, or as a time-division liquid crystal barrier based on time-division electrodes;
a display panel configured to fix positions of pixels for outputting a left image and positions of pixels for outputting a right image when the dual liquid crystal barrier operates as the space-division liquid crystal barrier, and configured to alternately change the positions of the pixels for outputting the left image and the positions of the pixels for outputting the right image when the dual liquid crystal barrier operates as the time-division liquid crystal barrier; and
a peripheral circuit configured to control operations of the dual liquid crystal barrier and operations of the display panel.

12. The device as claimed in claim 11, wherein the dual liquid crystal barrier includes:
a first substrate having the space-division electrodes, the space-division electrodes including first electrodes and second electrodes;
a second substrate having the time-division electrodes, the time-division electrodes including third electrodes and fourth electrodes;

a liquid crystal layer between the first substrate and the second substrate;

a first polarizing plate on one surface of the first substrate; and a second polarizing plate on one surface of the second substrate.

13. The device as claimed in claim 12, wherein:

the dual liquid crystal barrier operates as the time-division liquid crystal barrier when an external temperature is higher than a predetermined temperature, and the dual liquid crystal barrier operates as the space-division liquid crystal barrier when the external temperature is not higher than the predetermined temperature.

14. The device as claimed in claim 12, wherein:

the dual liquid crystal barrier operates as the time-division liquid crystal barrier when a first external input is received, and the dual liquid crystal barrier operates as the space-division liquid crystal barrier when a second external input is received.

15. The device as claimed in claim 12, wherein, when the dual liquid crystal barrier operates as the space-division liquid crystal barrier:

a driving voltage is applied to the first electrodes, a reference voltage is applied to the second electrodes, and a common voltage is applied to the third electrodes and the fourth electrodes.

16. The device as claimed in claim 15, wherein, when the dual liquid crystal barrier operates as the space-division liquid crystal barrier:

the space-division liquid crystal barrier operates in a normally white mode, and the driving voltage is determined to control the liquid crystal layer to block light, and the reference voltage and the common voltage are determined to be 0V.

17. The device as claimed in claim 16, wherein, when the dual liquid crystal barrier operates as the space-division liquid crystal barrier:

positions corresponding to the first electrodes act as blocking areas in the liquid crystal layer, and positions corresponding to the second electrodes act as opening areas in the liquid crystal layer.

18. The device as claimed in claim 12, wherein, when the dual liquid crystal barrier operates as the time-division liquid crystal barrier:

a driving voltage and a reference voltage are alternately applied to the third electrodes and the fourth electrodes, respectively, and a common voltage is applied to the first electrodes and the second electrodes.

19. The device as claimed in claim 18, wherein, when the dual liquid crystal barrier operates as the time-division liquid crystal barrier:

the time-division liquid crystal barrier operates in a normally white mode, and the driving voltage is determined to control the liquid crystal layer to block light, and the reference voltage and the common voltage are determined to be 0V.

20. The device as claimed in claim 19, wherein, when the dual liquid crystal barrier operates as the time-division liquid crystal barrier:

during a first period, positions corresponding to the third electrodes act as blocking areas in the liquid crystal layer, and positions corresponding to the fourth electrodes act as opening areas in the liquid crystal layer, and during a second period, the positions corresponding to the third electrodes act as the opening areas in the liquid crystal layer, and the positions corresponding to the fourth electrodes act as the blocking areas in the liquid crystal layer.

* * * * *